United States Patent [19]

Ohtani et al.

[11] Patent Number: 4,626,921
[45] Date of Patent: Dec. 2, 1986

[54] METHOD AND CIRCUIT FOR DEMODULATING ENCODED DATA OF FACSIMILE APPARATUS

[75] Inventors: Nobuhiro Ohtani; Hidekazu Sakurai, both of Tokyo, Japan

[73] Assignee: NEC Corporation, Tokyo, Japan

[21] Appl. No.: 630,160

[22] Filed: Jul. 12, 1984

[30] Foreign Application Priority Data

Jul. 12, 1983 [JP] Japan ............................. 58-127166

[51] Int. Cl.$^4$ .............................................. H04N 1/40
[52] U.S. Cl. ....................................... 358/260; 358/261
[58] Field of Search ................................. 358/260, 261

[56] References Cited

U.S. PATENT DOCUMENTS 3,927,251 12/1978 White et al. ..................... 358/261
4,245,257 1/1981 Yamazaki et al. ................ 358/261
4,486,784 12/1984 Abraham et al. .................. 358/261

FOREIGN PATENT DOCUMENTS 57-162884 3/1981 Japan .

OTHER PUBLICATIONS

CCITT Yellow Book, vol. VII-Fascicle VII.2, Geneva, 1981, pp. 225-235.

Primary Examiner—James J. Groody
Assistant Examiner—Edward L. Coles
Attorney, Agent, or Firm—Sughrue, Mion, Zinn, Macpeak and Seas

[57] ABSTRACT

In order to increase decoding speed of two-dimensionally encoded facsimile data, changing pixels $a_0$, $a_1$, $a_2$ and $b_1$ (defined by CCITT) on a decoding and reference lines are detected, and the address of $b_1$ is stored into a reference line address memory. The address of $b_1$ is compared with the address of $a_1$ during the vertical mode, and if $a_1 > b_1$, the address of $a_1$ is stored into the reference line address memory. During the horizontal mode, the addresses of $b_1$ and $a_2$ are compared. If $a_2 > b_1$, the address of $a_2$ is stored into the reference line address memory.

3 Claims, 12 Drawing Figures

METHOD AND CIRCUIT FOR DEMODULATING ENCODED DATA OF FACSIMILE APPARATUS

BACKGROUND OF THE INVENTION

1. Field of the Invention

The present invention relates to a method and a circuit for demodulating encoded data of facsimile apparatus, and more specifically to such a method and a circuit which features high speed decoding of incoming facsimile signals which are two-dimensionally encoded by, for example, the modified READ (Relative Element Address Designate) encoding scheme.

2. Description of the Prior Art

In order to speed up document transmission in a facsimile system, two-dimensional encoding methods have been employed. An example of such a two-dimensional encoding method is the modified READ encoding scheme standardized by CCITT (The International Telegraph and Telephone Consultative Committee) for Group 3 facsimile apparatus, in "Telegraph and Telematic Services Terminal Equipment, Recommendations of the S and T series" volume VII-fascicle VII.2, pp. 225–235.

Prior to a detailed discussion of the prior art and present invention, the modified READ encoding scheme will be discussed.

The modified READ coding scheme is a line-by-line encoding system in which the position of each changing pixel on the current encoding line is encoded with respect to the position of a corresponding reference pixel positioned on either the coding line, or the reference line which immediately precedes the coding line. After the coding line has been encoded, it becomes the reference line for the next coding line.

1. DEFINITION OF CHANGING PIXEL

A changing pixel is defined as an element whose "color" (i.e. black or white) is different from that of the previous element along the same line.

In FIG. 1

- $a_0$: denotes the reference or start of changing pixel on the coding line. At the start of the coding line $a_0$ is set on an imaginary white changing pixel situated just before the first element on the line. During the encoding of the coding line, the position of $a_0$ is defined by the previous coding mode;
- $a_1$: denotes the next changing pixel, to the right of $a_0$ on a coding line;
- $a_2$: the next changing pixel, to the right of $a_1$, on the coding line;
- $b_1$: the first changing pixel on the reference line, to the right of $a_0$, and opposite in color to $a_0$; and
- $b_2$: the next changing element, to the right of $b_1$, on the reference line.

2. DEFINITION OF CODING MODES

One of three coding modes are chosen according to the coding procedure which will be described in connection with item 3 set forth hereinlater. This mode will be followed to encode the position of each changing element along the coding line. Examples of the three coding modes are given in FIGS. 1, 2 and 3.

(a) PASS MODE

This mode is identified when the position of $b_2$ lies to the left of $a_1$. When this mode has been encoded $a_0$ is set on the pixel of the coding line below $b_2$ in preparation for the next coding (i.e. on $a'_0$) (FIG. 1). However, the case where $b_2$ occurs immediately above $a_1$, as shown in FIG. 2, is not considered as the pass mode.

(b) VERTICAL MODE

When this mode is identified, the position of $a_1$ is encoded relative to the position of $b_1$. The relative distance $a_1b_1$ can take on one of seven values $V(0)$, $V_R(1)$, $V_R(2)$, $V_R(3)$, $V_L(1)$, $V_L(2)$ and $V_L(3)$, each of which is represented by a separate code word. The subscript R and L indicated that $a_1$ is to the right or left respectively of $b_1$. The number in brackets indicates the valve of the distance $a_1b_1$. After vertical moding has occured, the position of $a_0$ is set on $a_1$ (see FIG. 3).

(C) HORIZONTAL MODE

When this mode is identified, both the run-lengths $a_0a_1$ and $a_1a_2$ are encoded using the code words $H+M(a0a1)+M(a1a2)$. H is the flag code word 001 taken from the two-dimensional code table shown as Table 3/T.4 at page 230 of the prior art CCITT reference. $M(a_0a_1)$ and $M(a_1a_2)$ are code word which represent the lengths and "colors" of the runs $a_0a_1$ and $a_1a_2$ respectively and comprise appropriate white or black modified Huffman code words. After horizontal mode encoding, the position of $a_0$ is set on $a_2$ (see FIG. 3).

3. CODING PROCEDURE

The coding procedure identifies the coding mode that is to be used to encode each changing pixel along the coding line. When one of the three modes has been identified according to step 1 or Step 2 (set forth hereinunder), an appropriate code word is selected from the code table given in Table 3/T.4 in the aforementioned CCITT volume.

STEP 1

(i) If the pass mode is identified, it is encoded using the word 0001 (see Table 3/T.4). After the processing, pixel $a'_0$ just under $b_2$ is regarded as the new starting pixel $a_0$ for the next encoding (see FIG. 1).

(ii) If the pass mode is not detected, then the operation proceeds to Step 2.

STEP 2

(i) The absolute value of the relative distance $a_1b_1$ is determined. As shown in Table 3/T.4, if $a_1b_1$ is equal to or greater than 3, $a_1b_1$ is encoded by the vertical mode. Position $a_1$ is then regarded as the new starting pixel $a_0$ for the next coding. Following the horizontal mode code 001, if $a_1b_1$ is greater than 3 $a_0a_1$ and $a_1a_2$ are respectively encoded by one-dimensional coding. After this processing, position $a_2$ is regarded as the new starting pixel $a_0$ for the next coding.

4. PROCESSING THE FIRST AND LAST PIXELS ON A LINE (i) Processing the first pixel The first starting pixel $a_0$ on each coding line is imaginarily set at a position just before the first picture element, and is regarded as a white pixel. The first run-length on a line $a_0a_1$ is replaced by $a_0a_1-1$. Therefore if the first run is black and is deemed to be encoded by horizontal mode coding, then the first code word $M(a_0a_1)$ corresponds to a white run of zero length.

(ii) Processing the last pixel

The encoding of the coding line continues until the position of the imaginary changing pixel situated just after the last actual element has been encoded. This may be encoded as $a_1$ or $a_2$. Also, if $b_1$ and/or $b_2$ are not detected at any time during the encoding of the line, they are positioned on the imaginary changing pixel situated just after the last actual pixel on the reference line.

5. LINE SYNCHRONIZATION CODE WORD

To the end of every code line is added the end-of-the line (EOL) code word 000000000001. The EOL code word is followed by a single tag bit which indicates whether one- or two-dimensional coding is used for the next line. Two-dimensional coding proceeds line by line considering a correlationship between the lines. Thus, any error renders the whole information erroneous in the coding for the following lines. For this reason, one dimensional coding precedes two-dimensional coding once for every predetermined number of lines. The format EOL+0, therefore indicates that the next line will be subject to two-dimensional coding.

FIG. 4 shows a reference and decoding lines for discussing the difficulties encountered with prior art, wherein the decoding line is assumed to be reproduced by decoding encoded data $V_R(1)$, $V_L(3)$, $V_R(2)$ in this order. As shown, the address of the changing pixel $b_1$ on the reference line is B2, so that black pixels are written up to the address A2. At this time, a reference line address pointer is the address B2, while a decoding line address pointer is the same address, viz. A2. In the next step, the decoding line address pointer assumes the address A8 which is preceded by the address of $b_1'$, and thence white pixels are written up to the address A8. Thereafter, the decoding line address pointer is increased by one address. The second encoded data $V_L(3)$ indicates that the changing pixel $a_1'$ is positioned to the left of $b_1'$ by three pixels, so that the decoding line address pointer returns to A6 and thence black pixels are written into up to A10 (which is preceded by the address of $b_1$). Thereafter, the decoding line address pointer is increased by one address. The third encoded data $V_R(2)$ is reproduced by writing two black pixels into the addresses A11 and A12, after which the decoding line address pointer is increased by one address.

It is understood from the above that when $a_1$ is positioned to the left of $b_1$ (viz., the code word is $V_L(X)$ wherein X=1, 2 or 3), the decoding line address pointer is decreased by "X". This means that the decoding line includes portions which are reproduced by writing pixels two times, thereby lowering the decoding speed.

One approach to overcoming the above-mentioned problem is disclosed in Japanese patent application No. 56-48605 which has been laid open under the publication No. 57-162884. This prior art however has been encountered with a difficulty that both the reference and decoding line address pointers should be increased, pixel by pixel, in order to reproduce the decoding line. As a consequence, it is difficult with this prior art to increase the decoding speed to a considerable extent.

SUMMARY OF THE INVENTION

The object of the present invention is therefore to provide a method and a circuit which feature high speed decoding of two-dimensionally encoded facsimile signals.

The another object of the present invention is to provide a method and a circuit for achieving high speed decoding of two-dimensionally encoded facsimile signals during the vertical and/or horizontal modes.

In brief, these objects are fulfilled by detecting the changing pixels $a_0$, $a_1$, $a_2$ and $b_1$ (defined by CCITT) on a decoding and reference lines. The address of $b_1$ is stored into a reference line address memory. The address of $b_1$ is compared with the address of $a_1$ during the vertical mode, and if $a_1 > b_1$, the address of $a_1$ is stored into the reference line address memory. During the horizontal mode, the addresses of $b_1$ and $a_2$ are compared. If $a_2 > b_1$, the address of $a_2$ is stored into the reference line address memory.

More specifically, a first aspect of the present invention takes a form of a method of decoding two-dimensionally encoded facsimile data, wherein the decoding is implemented by using the interrationship between a decoding line and a reference line immediately preceding the decoding line, wherein the two-dimensionally encoded facsimile data are grouped into a horizontal mode, a vertical mode and a press mode, wherein a changing pixel is defined as an element whose color is different from that of the previous element along the same line, and wherein $a_0$ is a reference element; $a_1$ is the next changing element to the right of $a_0$ on the coding line; $a_2$ is the next changing element to the right of $a_1$ on the coding line; $b_1$ is the first changing element on the reference line to the right of $a_0$ and of opposite color to $a_0$;

the method comprising the steps of: receiving the encoded facsimile data; detecting $b_1$; detecting $a_1$ and $a_2$; storing the address of $b_1$ into a reference line address memory, the changing pixels on the reference line being detected by continuously increasing the address of the reference line address memory; comparing the addresses of $b_1$ and $a_1$ during the vertical mode, and if $a_1 > b_1$, the address of $a_1$ is stored into the reference line address memory; comparing the addresses of $b_1$ and $a_2$ during the horizontal mode, and if $a_2 > b_1$, the address of $a_2$ is stored into the reference line address memory.

A second aspect of the present invention takes a form of an apparatus for decoding two-dimensionally encoded facsimile data, wherein the decoding is implemented by using the interrelationship between a decoding line and a reference line immediately preceding the decoding line, wherein the two-dimensionally encoded facsimile data are grouped into a horizontal mode, a vertical mode and a pass mode, wherein a changing pixel is defined as an element whose color is different from that of the previous element along the same line, and wherein $a_0$ is a reference element; $a_1$ is the next changing element to the right of $a_0$ on the coding line; $a_2$ is the next changing element to the right of $a_1$ on the coding line; $b_1$ is the first changing element on the reference line to the right of $a_0$ and of opposite color to $a_0$;

the apparatus comprising: a first means for receiving and decoding the encoded facsimile data; a second means for receiving and processing the decoded data from the first means and for controlling the first means, the second means including a microprogrammed control unit, the microprogrammed control unit storing the address of $b_1$ into a reference line address memory which is utilized to detect the changing pixels on the reference line by continuously increasing the address of the reference line address memory, and comparing the addresses of $b_1$ and $a_1$ during the vertical mode, and if $a_1 > b_1$, the address of $a_1$ being stored into the reference line address memory, the microprogrammed control unit further comparing the addresses of $b_1$ and $a_2$ during the horizontal mode, and if $a_2 > b_1$, the address of $a_2$ being stored into the reference line address memory; a third means which operates under the control of the second means and which includes, two line memories for alternately storing therein the reference and decoding lines, a control unit which writes the decoded data into one of the two line memories and detects the changing pixels on the reference line stored in the other line memory.

BRIEF DESCRIPTION OF THE DRAWINGS

The features and advantages of the present invention will become more clearly appreciated from the following description taken in conjunction with the accompanying drawings in which like blocks, circuits or circuit elements are denoted by like reference numerals and in which.

DETAILED DESCRIPTION OF THE PREFERRED EMBODIMENTS

Figure 1:
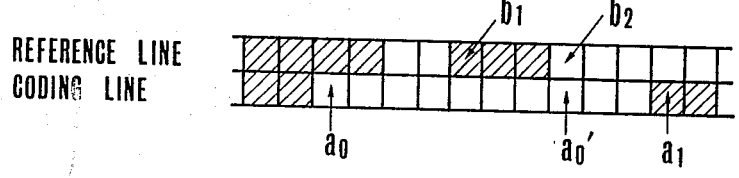
FIGS. 1 and 2 show the pass mode in the modified READ coding.
Figure 2:
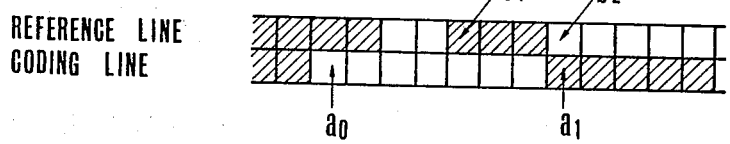
Figure 3:
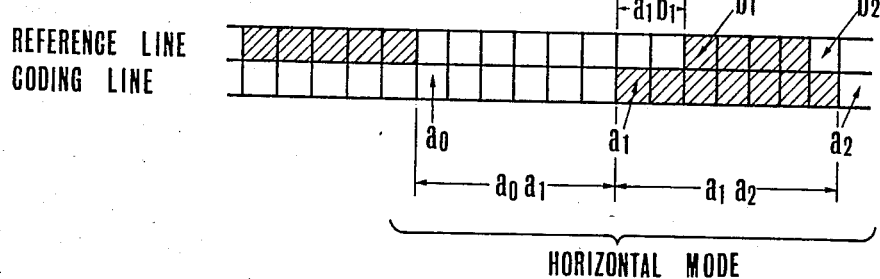
FIG. 3 shows the vertical mode and a horizontal mode in the modified READ coding.
Figure 4:
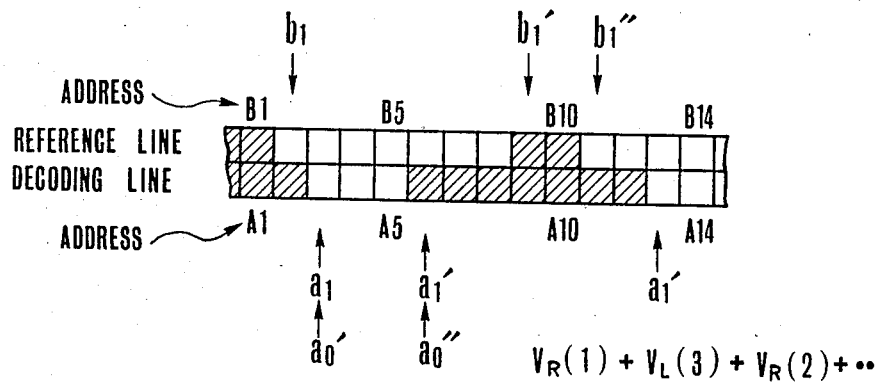
FIG. 4 shows a reference line and a decoding line utilized for explaining prior art.
Figure 5:
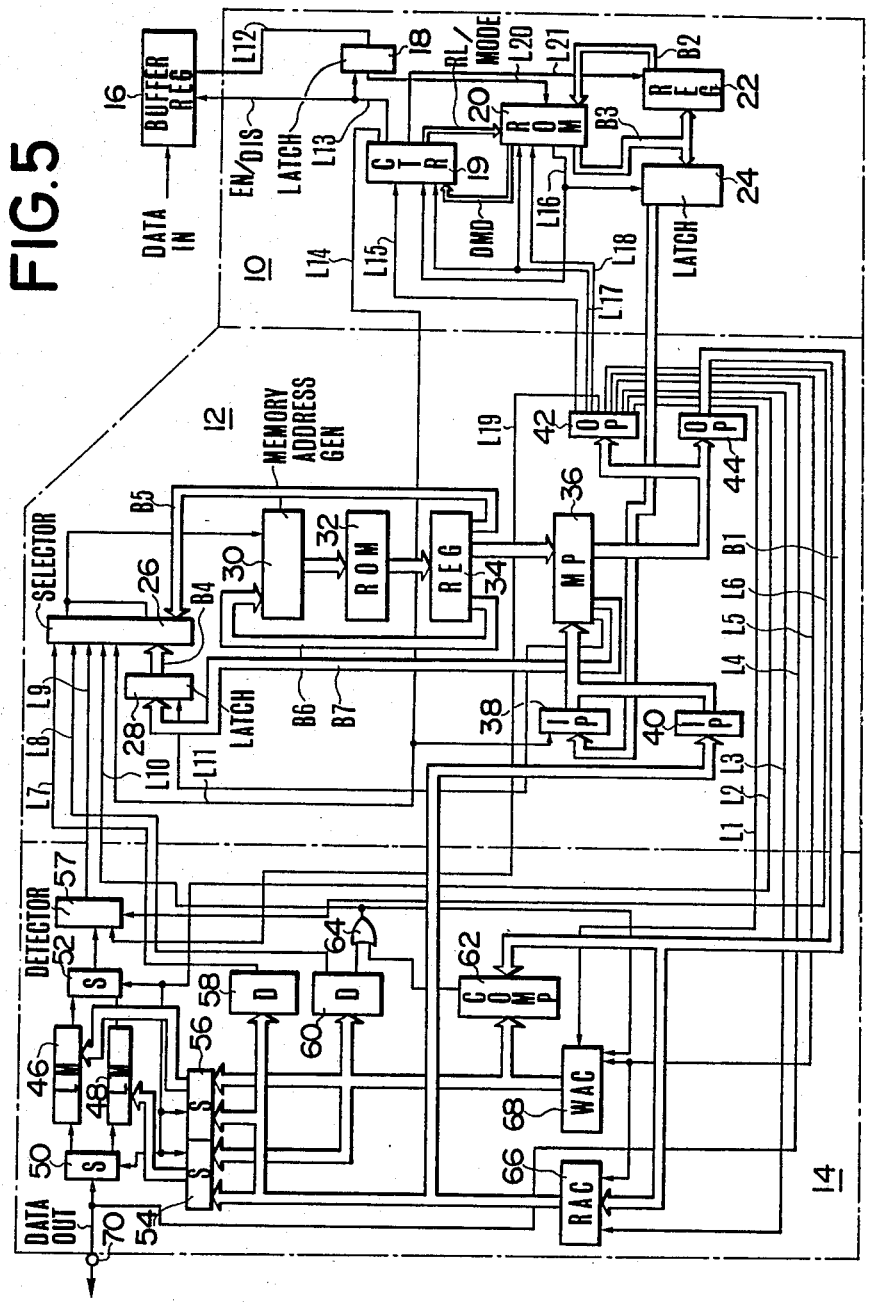
FIG. 5 shows in block diagram form a decoding circuit with which the present invention is concerned.

Referring now to FIG. 5, there is shown in block diagram form an example of a decoding circuit with which the present invention is concerned.

As shown, the FIG. 5 circuit arrangement generally comprises a first, second and third sections 10, 12 and 14. It should be noted that in FIG. 5 clock pluse lines are not shown for simplicity.

The first section 10 is adapted to receive encoded data from a buffer register 16 and thence decodes the encoded data applied. The decoded data is transferred to the second section 12. As shown, a latch circuit 18 is coupled to the buffer register 16 via a line L12. A decoding control circuit (CTR) 19 is arranged to receive and output various control signals, by way of lines L13 through L18 and L21 and bus lines DMD and RL/MODE, in order to control the operations of the sections 10 and 12. A ROM (Read Only Memory) 20 is provided with a decoding table for decoding the encoded data which are applied from a latch circuit 18 via a line L20. A register 22 is responsive to a clock pulse and supplies, via a bus line B2, the ROM 20 with the content thereof which has been stored in response to the immediately preceding clock pulse. A line L21, extending from the controller 19 to the register 22, is provided for clearing the latter. A latch circuit 24 is provided to latch the output of the ROM 20, appearing on a bus line B3, in response to a control signal applied from the ROM 20 via the line 16. The latched decoded data is transferred to the second section 12.

The second section 12 is a controlling section which includes a selector 26, a latch circuit 28, a memory address generator 30, a ROM 32 having therein a plurality of microinstruction routines, a pipeline type register 34, a microprocessor 36, two input ports 38 and 40, and two output ports 42 and 44, all of which are coupled as shown.

The selector 26 is adapted to receive various control signals: (1) a signal indicative of the end of a reference line (via a line L7), (2) a signal advising the end of a decoding line (via a line L8), (3) a signal representative of detection of a changing pixel on the reference line (via a line L9), (4) a signal indicating the detection of a changing pixel on the decoding line (via a line L10), (5) a signal indicative of completion of decoded data transfer, which is applied via a line L11 from the controller 19 of the first section 10, and (6) an output of the latch circuit 28 (via a bus line B4). The selector 26 selects the above-mentioned inputs under the control of the register through a bus line B5. The memory address generator 30 selects an appropriate microinstruction routine in response to the output of the selector 26, and supplies the ROM 32 with the first address of the selected microinstruction routine previously stored in the ROM 32. The microprocessor 36 is supplied with the selected microinstruction through the register 34, and implements predetermined operations. The blocks 26, 28, 30, 32, 34 and 36 are connected via bus lines B4, B5, B6, B7, etc., and constitute a high speed processing unit which concurrently fetches and executes instructions under microprogrammed control. This kind of unit using a pipeline type register is known in the computer technique field, so that further description will be omitted for simplicity. The microprocessor 36 is supplied with various inputs and generates various control signals/data, on lines L1 through L6, L14, L15, L17, L18, L19 and a bus $b_1$, by way of the output ports 42 and 44. The signal and data pertinent to the present invention will be discussed later.

The third section 14 includes two line memories 46 and 48, four selectors 50, 52, 54 and 56, a detector 57 for detecting changing pixels on the reference line, two end-of-line detectors 58 and 60, a comparator 62, an OR gate 64, a read address counter (RAC) 66, and a write address counter (WAC) 68, all of which are coupled as shown. The line memories 46 and 48 are arranged to alternately store adjacent two decoding lines by the selectors 50, 54 and 56, which are controlled by the microprocessor 36 via the line L2. The detectors 58 and 60 are adapted to detect the ends of reference and decoding lines, respectively. If the line memory 48 is directed to store a currently decoding line data, then, the decoding line which has already been stored in the other line memory 46 is used as a reference line. In this case, the selectors 50 and 52 respectively select the line memories 48 and 46, while the selector 54 couples the WAC 68 to the line memory 48 and while the selector 56 couples the RAC 66 to the line memory 46. Like the selectors 50, 54 and 56, the selector 52 is also switched over by the microprocessor 36 via the line L2. The decoded data is written into the selected line memory and also is applied to an outer circuit (not shown) through an output terminal 70. The end-of-line detector 58 is supplied with read addresses from RAC 66, and, upon detection of the line-end address, applies a detection signal to the selector 26 via the line L7. Similarly, the end-of-line detector 60 receives write addresses from WAC 68, and, upon detection of the line-end address, applies a detection signal to the selector 26 via the line L8. The operations of the other blocks of the section 14 will be described in detail hereinlater.

The present invention will be described in more detail with reference to FIGS. 5 through 12.

Figure 6:
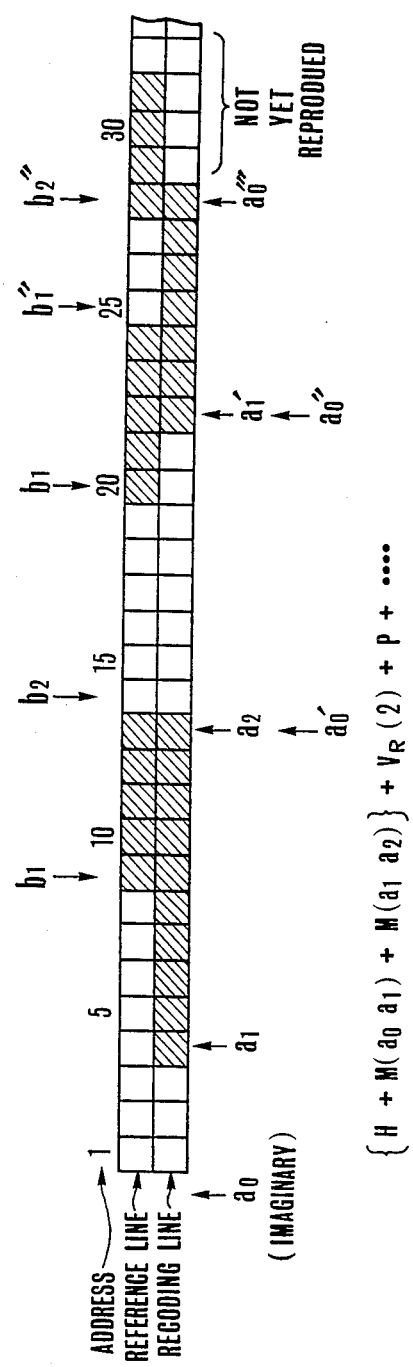
FIGS. 6 through 12 show the steps of a flowchart characterizing the present invention.

FIG. 6 shows a reference line and a current decoding line immediately following the reference line, together with encoded data denoted by "$(H+M(a_0a_1)+M(a_1a_2))+V_R(2)+P+\ldots$". In FIG. 6, the changing pixels on the reference and coding lines are denoted by $a_0, a_1, \ldots, b_1, b_2, \ldots,$ and $b_2''$. The decoding line of FIG. 6 is assumed to be reproduced by decoding the above-mentioned encoded data. As shown, the run length of $a_0a_1$ is 3 (white pixels), and that of $a_1a_2$ is 9 (black). FIGS. 7 through 12 are flowcharts which characterize the advantages of the present invention along.

It is assumed for the sake of simplicity that (1) one line has been already decoded and stored in the line memory 46 as the reference line shown in FIG. 6, and (2) the next operation of the FIG. 5 circuit is to detect the EOL code word which is attached to the end of the reference line although not shown. In the following discussion, it is further assumed that the microproccesor 36 already controls the selectors 50, 52, 54 and 56, via the output port 42 and the line L2, such that (1) the selector 50 is coupled to the line memory 48 for storing currently decoding or reproducing pixels, (2) the selector 52 couples the line memory 46 to the reference line changing pixel detector 57 for detecting changing pixels on the reference line, (3) the selector 54 couples the write address counter (WAC) 68 to the line memory 48, and (4) the selector 56 couples the read address counter (RAC) 66 to the line memory 46.

First, the output port 42 applies a clear signal to the RAC 66 and WAC 68, by way of the line L5, thereby initializing same (step 100 (FIG. 7)). It should be noted that all the outputs of the output ports 42 and 44 are controlled by the microprocessor 36 although not necessarily referred to hereinlater. The output port 42 applies a decoding demand signal to the controller 19 via the line L15, and also applies an EOL search demand signal to the controller 19 and the ROM 20 via the line L17 (step 102). The controller 19 outputs three control signals: (1) a clear signal which is applied to the register 22 for clearing same via the line L21, (2) a MODE signal which is applied to the ROM 20 via the bus line RL/MODE, and (3) an enable signal (EN) which is applied to the latch circuit 18 and the buffer register 16 via the line 13 (step 104 (FIG. 8)). The controller 19 outputs the MODE signal via the RL/MODE bus line except the case where the ROM 20 is to decode a run length.

Encoded data are sequentially read from the buffer register 16 to the ROM 20 via the lines L12 and L20 (step 106), and thereafter the ROM 20 starts decoding the encoded data applied (step 108). Upon completion of the decoding, the ROM 20 outputs the following signals: (1) a decoding mode (DMD) signal which is fed to the controller 19 via the bus line DMD and which in this instant indicates EOL mode, and (2) a decoding completion signal which is applied to the controller 19 and the latch circuit 24 via line L16 (step 110). At step 112, the latch circuit 24 latches the decoded data stored in register 22 in response to the decoding completion signal applied from the ROM 20 via the line 16.

At step 114, the decoded data latched at the latch circuit 24 is transferred to the microprocessor 36 via the input port 38, while the controller 19 outputs a signal which indicates the transfer of the latched data to the microprocessor 36 and which is applied to the microprocessor 36 (via the line 14 and the input port 38) and to the selector 26 (via the line 14). At step 116, the controller 19 generates a disable signal (DIS) in response to the transfer of the latched data from the latch circuit 24 to the microprocessor 36. This disable signal is applied to the buffer register 16 and the latch circuit 19, via the line L13, in order to disable the operations thereof. At step 118, the controller 19 determines whether the DMD signal is Horizontal Mode, Vertical Mode, Pass Mode or EOL Mode. In this instant, the DMD signal represents EOL Mode.

At step 122 (FIG. 7), the output port 42 produces, on a line L6, a signal requesting the detection of changing pixel on the reference line ($b_1$ in FIG. 6). The detector 57 is responsive to this signal and detects the first changing pixel $b_1$ on the reference line, and, upon detection, applies a signal to the selector 26 via a line L9. In response to this signal, the generator 30 selects a predetermined microinstruction routine, applying the first address thereof to the ROM 32. Then, the ROM 32 applies the selected microinstruction routine to the microprocessor 36 via the register 34. Since the microprocessor 36 controls the RAC (read address counter) 66, the address of the changing pixel $b_1$ is identified and stored in a suitable memory area of the microprocessor 36. Then, the program returns to step 104 (FIG. 8) in order to decode the code word (001) representing Horizontal Mode.

In steps 104 through 116, the code word (001) of Horizontal Mode is decoded, and the decoded data is transferred to the microprocessor 36. The steps 104 through 116 have already been described, so that further discussion will be omitted for simplicity. At step 118, the controller 19 identifies that the decoded data represents the Horizontal Mode, and thence the program proceeds as shown in the next flowchart including steps 124 through 140, in which the run lengths of Horizontal Mode are decoded or reproduced.

At step 124, the controller 19 produces the following signals: (1) the clear signal which is applied via the line L21 to the register 22 for initializing same, (2) the mode signal indicative of Run Length, which is applied to the ROM 20 via the bus line RL/MODE, and (3) the enable signal (EN) which is applied to the buffer register 16 and the latch circuit 18 via the line L13. Encoded data (the code word indicative of $a_0a_1$ in this instant) is sequentially read from the buffer register 16 to the ROM 20 via the lines L12 and L20 (step 126), and thereafter the ROM 20 starts decoding the encoded data applied (step 128). It should be noted that the run length $a_0a_1$ (viz., the run length of 3 white pixels) is decoded. Upon completion of the decoding, the ROM 20 outputs, at step 130, the following signals: (1) the decoding mode (DMD) signal which is fed to the controller 19 via the bus line DMD and which indicates the "terminating" code of the Run Length mode, and (2) the decoding completion signal which is applied to the controller 19 and the latch circuit 24 via the line L16. At step 132, the latch circuit 24 latches the decoded data applied from the register 22 in response to the signal from the ROM 20 via the line L16. The decoded data latched at the latch circuit 24 is transferred to the microprocessor 36 via the input port 38 (step 134). At step 136, the controller 19 generates the disable signal (DIS) in response to the transfer of the latched data from the circuit 24 to the microprocessor 36. This disable signal is applied to the buffer register 16 and the latch circuit 18 in order to disable the operations thereof.

At step 138, the run length code is checked with respect to the type thereof: the terminating code or the make-up code. In this instant, the run length code is the terminating code so that step 140 is implemented. In this step, a check is performed as to whether both $a_0a_1$ and $a_1a_2$ have been decoded. Since $a_1a_2$ is not yet decoded in this instant, the program returns to step 124 for decoding $a_1a_2$. When both $a_0a_1$ and $a_1a_2$ have been decoded, the program goes to step 142.

Figure 10:
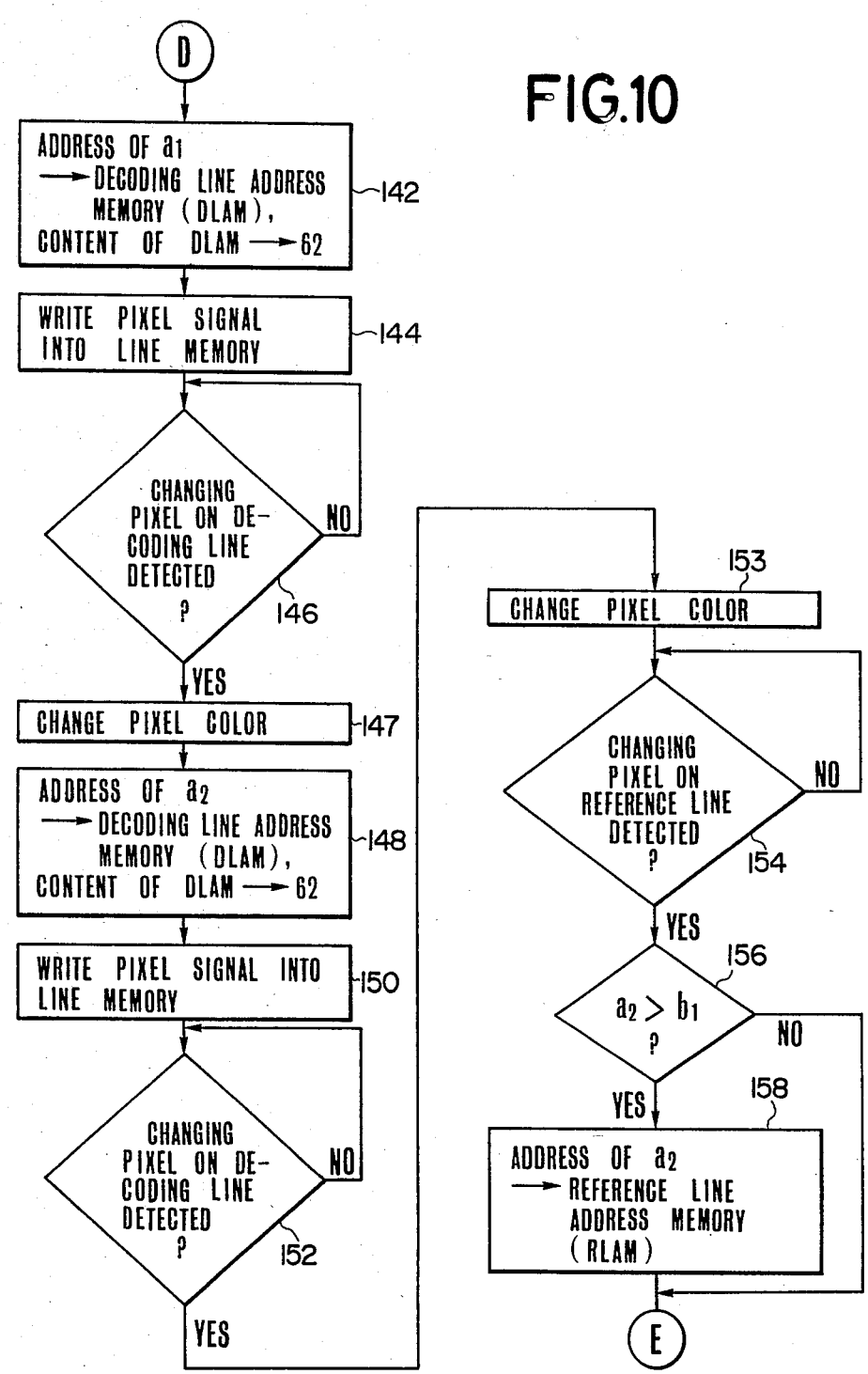

Although this is not the case presently considered, if the run length $a_0a_1$ or $a_1a_2$ (or both) is represented by a make-up code word plus a terminating code word, the make-up code word is first decoded. Thereafter, the program returns to step 124 in order to decode the following terminating code word. After the decoding of the terminating code word, step 140 is repeated. Thus, each run length of Horizontal Mode is decoded, after which the program goes to step 142 (FIG. 10).

Figure 7:
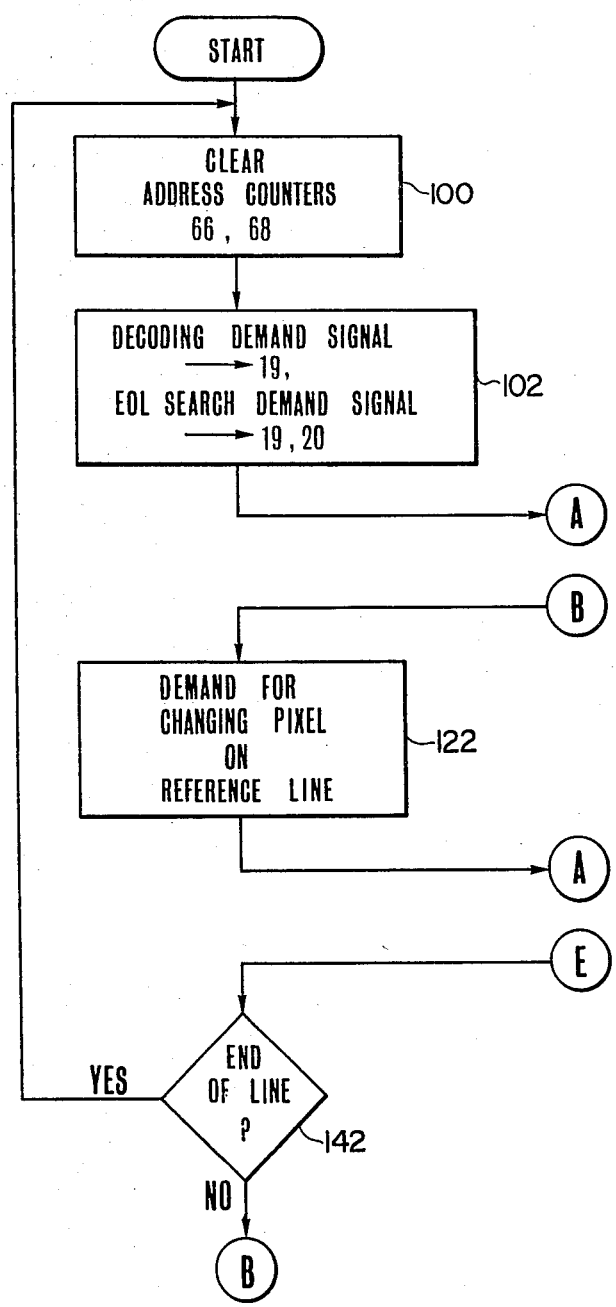

At step 142, the address $a_1(=4$ in this instant) is stored in a decoding line address memory (DLAM) which is provided in the microprocessor 36. Then, the microprocessor 36 determines the color (black or white) of the pixels to be written in the next step, and applies the content of the DLAM to the comparator 62 via the bus line $b_1$, and thereafter applies a write demand signal to the WAC 68 via the line L1. At step 144, the WAC 68 starts address counting in response to the write demand signal, and, concurrently, the microprocessor 36 produces, via the line L4, the pixel signals which are written into the line memory 48 via the selector 50 and which are derived through the output terminal 70. At step 146, the comparator 62 checks whether the content of the DLAM (viz. address 4 in this case) coincides with the output of the WAC 68. If the result of this check is "yes", the comparator 62 outputs a signal indicating the detection of a changing pixel on the decoding line, which signal is applied to the selector 26 via the OR gate and the line L10, and also applied to the WAC 68 via the OR gate 64. The WAC 68 terminates the address counting in response to the output of the OR gate 64, so that white pixels are written into the line memory 48 up to the address 3 in this instant. At step 147, the microprocessor 36 changes the color of pixels which to be written in the following step. The following steps 148, 150, 152 and 153 are the same as steps 142, 144, 146 and 147 except that the address $a_2$ is stored in the DLAM (step 148) in replacement of that of $a_1$, so that further description will be omitted for simplicity. It should be noted that at step 150 black pixels are written into the line memory 48 up to the address 12 in this instant. At step 154, a check is implemented as to whether a changing pixel on the reference line is detected. This check is carried out by increasing, pixel by pixel, the address of a reference line address memory (RLAM) which is provided in the microprocessor 36. If the result of this check is "yes" (this means that the address of $b_1$ is detected), the program goes to step 156. At step 156, the addresses of $a_2$ and $b_1$ are compared, and if $a_2 > b_1$, then the content of the RLAM is replaced by the address of $a_2$ (step 158). Contrarily, if $a_2 < b_1$, the program directly goes to step 142 (FIG. 7).

It is understood that in the Horizontal Mode, if the address of $a_2$ is larger than that of $b_1$, the content of the RLAM (reference line address memory) jumps to the address of $a_2$. Consequently, the next changing pixel $b_1'$ detected much faster as compared with the case where the RLAM is increased pixel by pixel from the address of $b_1$.

Figure 8:
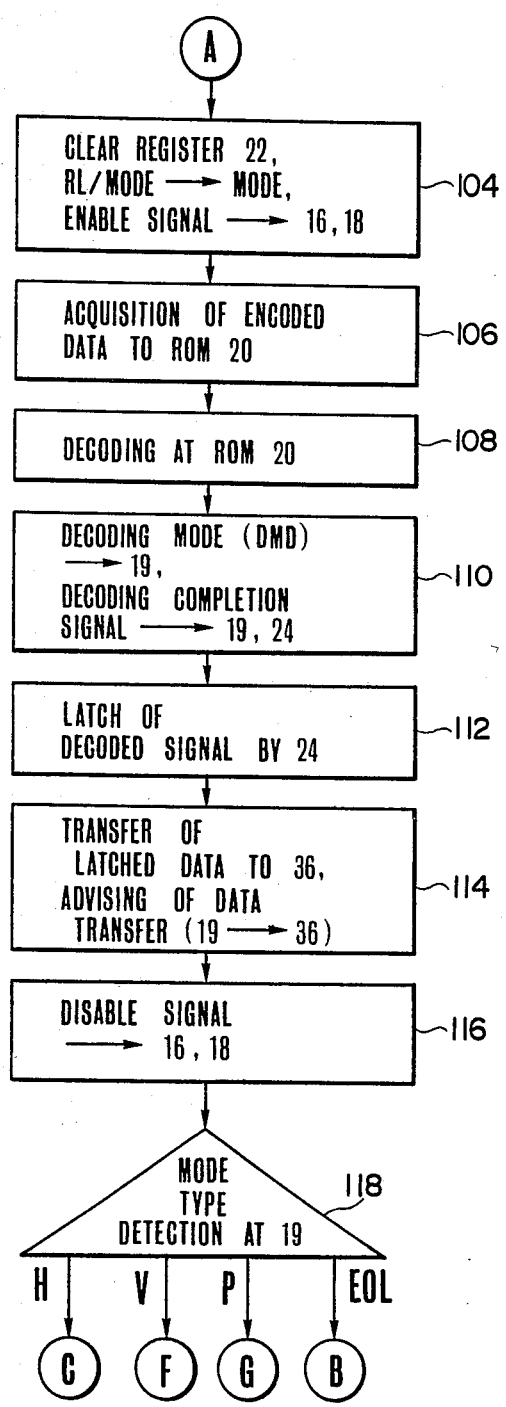
Figure 9:
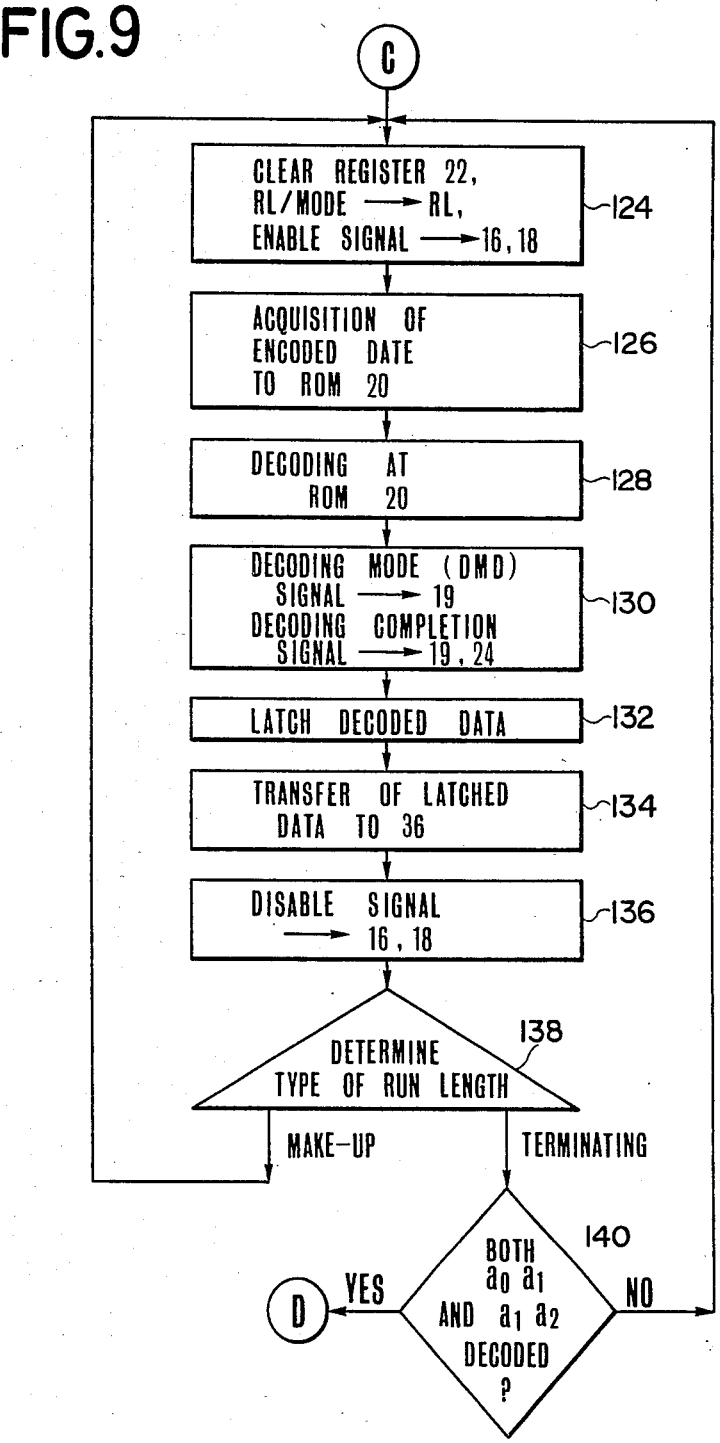
Figure 11:
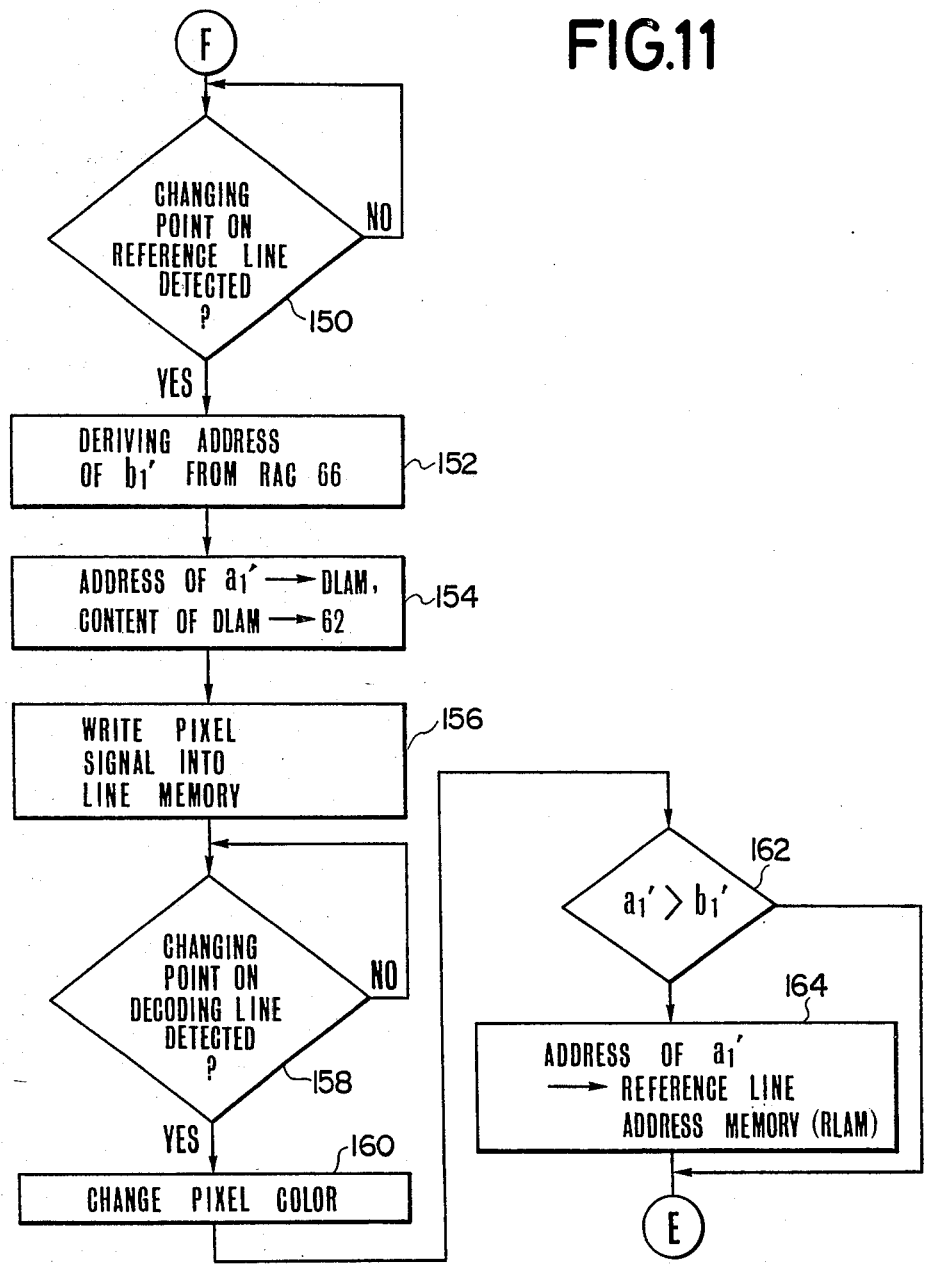

At step 142 (FIG. 7), since the end of line is not yet detected in this instant, the program goes to step 122, after which the steps shown in FIG. 8 are first implemented in order to decode the encoded data $V_R(2)$ in this instant. At step 118, the vertical mode is detected so that step 150 shown in FIG. 11 is carried out.

At step 150, the microprocessor 36 checks whether the changing pixel $b_1'$ (positioned at the address 20) on the reference line is detected. If $b_1'$ is detected, the microprocessor 36 fetches the address of $b_1'$ from the RAC 66 by way of the input port 40 (step 152), and thence calculates the address of $a_1'$ by adding the address of $b_1'$ to "X" (wherein "X" denotes "X" of $V_R(X)$ or $V_L(X)$ and assumes a positive number in the case of $V_R$ and a negative number in the case of $V_L$). In this instant, "X" = +2, so that the address of $a_1'$ is 22. The address of $a_1'$ (viz., the result of the addition) is stored in the DLAM and thence is applied to the comparator 62 via the bus $b_1$ (step 154). At step 156, white pixel signals are written into the line memory 48 up to the address 21 (see FIG. 6) and concurrently are outputted via the terminal 70. At step 158, the microprocessor 36 checks whether the selector 26 receives the output of the OR gate 64 via the line L10. If the result of this check is "yes", the microprocessor 36 changes the color of pixels which are to be written into the following process (step 160), and compares the addresses of $a_1'$ and $b_1'$ (step 162). If $a_1' > b_1'$, the address of $a_1'$ is stored in the RLAM (step 164). Contrarily, if $a_1' < b_1'$, the program directly goes to step 142 (FIG. 7). As shown in FIG. 6, $a_1'$ is larger than $b_1'$, so that the content of the RLAM is changed from 20 to 22.

This means that in the Vertical Mode, if $a_1' > b_1'$, the address in the RLAM jumps from the address $b_1'$ to the address corresponding to $a_1'$. As a consequence, according to this invention, the decoding speed can be increase as compared with the prior art wherein the address increment is performed on the pixel by pixel basis.

Figure 12:
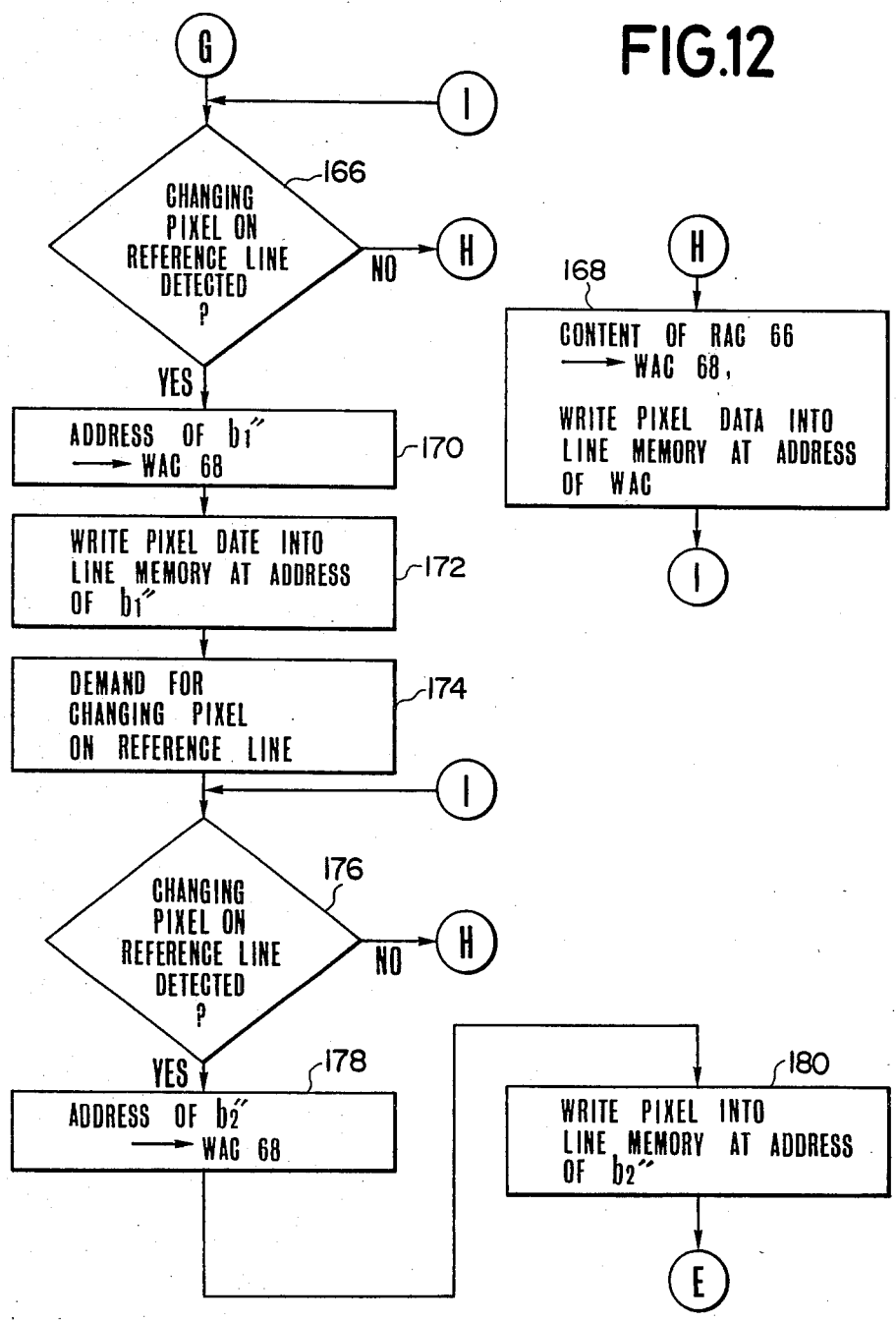

After the decoding of $V_R(2)$ is completed, the program goes to step 104 via steps 142 and 122 in order to decode the Pass Mode encoded data, viz., the last encoded data shown in FIG. 6. The steps 104 through 116 have been already discussed, so that further description thereof will be omitted. At step 118, the Pass Mode is detected and the program goes to step 166 (FIG. 12). At step 166, the microprocessor 36 checks whether the changing pixel $b_1''$ on the reference line is detected. If the check result is "no", the program goes to step 168 at which the content of the RAC 66 (the address 22 in FIG. 6) is fetched and then transferred to the WAC 68. Thereafter, a black pixel data is written into the address 22 of the decoding line. It should be noted that the fetch cycle and the execution cycle for processing the fetched data, are concurrently implemented under the microprogrammed control as previously referred to, whereby the decoding speed can be increased to a considerably extent. The operation at step 168 is repeated until the check result at step 166 becomes "yes". At this time point, the black pixels have been written up to the address 24 in the case shown in FIG. 6. If this check result is "yes", the address $b_1''$ is transferred to the WAC at step 170. Thereafter, a black pixel data is written into the line memory at the address which corresponds to that of $b_1''$ (step 172). At the next step 174, the microprocessor 36 demands the address of the next changing pixel on the reference line (viz., $b_2''$), and, at step 176, checks whether the changing pixel $b_2''$ on the reference line is detected. If the check result is "no", the program goes to step 168 the operation in which has been described. Steps 178 and 180 correspond to steps 170 and 172, respectively. Thus, black pixels are written into the addresses 24, 25 and 26 of the decoding line as shown in FIG. 6.

The foregoing description shows only preferred embodiments of the present invention. Various modifications are apparent to those skilled in the art without departing from the scope of the present invention which is only limited by the appended claims.

What is claimed is:

1. A method of decoding two-dimensionally encoded facsimile data,
   wherein the decoding is implemented by using the interrelationship between a decoding line and a reference line immediately preceding the decoding line,
   wherein said two-dimensionally encoded facsimile data are grouped into a horizontal mode, a vertical mode and a pass mode,
   wherein a changing pixel is defined as an element whose color is different from that of the previous element along the same line, and wherein
   $a_0$ is a reference element;
   $a_1$ is the next changing element to the right of $a_0$ on the coding line;
   $a_2$ is the next changing element to the right of $a_1$ on the coding line;
   $b_1$ is the first changing element on the reference line to the right of $a_0$ and of opposite color to $a_0$;
   said method comprising the steps of:
   receiving the encoded facsimile data;
   detecting $b_1$;
   detecting $a_1$ and $a_2$;
   storing the address of $b_1$ into a reference line address memory, the changing pixels on the reference line being detected by continuously increasing the address of said reference line address memory;
   comparing the addresses of $b_1$ and $a_1$ during said vertical mode, and if $a_1 > b_1$, the address of $a_1$ is stored into said reference line address memory;
   comparing the addresses of $b_1$ and $a_2$ during said horizontal mode, and if $a_2 > b_1$, the address of $a_2$ is stored into said reference line address memory.

2. An apparatus for decoding two-dimensionally encoded facsimile data,
   wherein the decoding is implemented by using the interrelationship between a decoding line and a reference line immediately preceding the decoding line,
   wherein said two-dimensionally encoded facsimile data are grouped into a horizontal mode, a vertical mode and a pass mode,
   wherein a changing pixel is defined as an element whose color is different from that of the previous element along the same line, and wherein
   $a_0$ is a reference element;
   $a_1$ is the next changing element to the right of $a_0$ on the coding line;
   $a_2$ is the next changing element to the right of $a_1$ on the coding line;
   $b_1$ is the first changing element on the reference line to the right of $a_0$ and of opposite color to $a_0$;
   said apparatus comprising:
   a first means for receiving and decoding said encoded facsimile data;
   a second means for receiving and processing the decoded data from said first means and for controlling said first means, said second means including a microprogrammed control unit, said microprogrammed control unit storing the address of $b_1$ into a reference line address memory which is utilized to detect the changing pixels on the reference line by continuously increasing the address of said reference line address memory, and comparing the addresses of $b_1$ and $a_1$ during said vertical mode, and if $a_1 > b_1$, the address of $a_1$ being stored into said reference line address memory, said microprogrammed control unit further comparing the addresses of $b_1$ and $a_2$ during said horizontal mode, and if $a_2 > b_1$, the address of $a_2$ being stored into said reference line address memory;
   a third means which operates under the control of said second means and which includes, two line memories for alternately storing therein the reference and decoding lines, a control unit which writes the decoded data into one of said two line memories and detects the changing pixels on the reference line stored in the other line memory.

3. An apparatus as claimed in claim 2, wherein said second means includes a plurality of microinstruction routines and being a type of concurrently fetching and executing the microinstruction routines.

* * * * *

UNITED STATES PATENT AND TRADEMARK OFFICE
CERTIFICATE OF CORRECTION

PATENT NO. : 4,626,921

DATED : December 2, 1986

INVENTOR(S) : OHTANI

It is certified that error appears in the above-identified patent and that said Letters Patent is hereby corrected as shown below:

Column 4, line 20, delete "press" and insert --pass--

Column 4, line 16, delete "interrationship" and insert --interrelationship--;

Column 5, line 36, delete "pluse" and insert --pulse--;

Column 9, line 60, before "detected" insert --is--;

Column 11, line 10, delete "interrationship" and insert --interrelationship--.

Signed and Sealed this

Eighth Day of September, 1987

Attest:

DONALD J. QUIGG

*Attesting Officer*  *Commissioner of Patents and Trademarks*